(12) United States Patent
Seve (10) Patent No.: US 7,617,023 B2
(45) Date of Patent: Nov. 10, 2009

(54) PROCESS AND DEVICE FOR MONITORING THE VALIDITY OF A SPEED CUE OF AN AIRCRAFT AND SYSTEM FOR GENERATING A SPEED CUE COMPRISING SUCH A DEVICE

(75) Inventor: Philippe Seve, Toulouse (FR)

(73) Assignee: AIRBUS France, Toulouse (FR)

( * ) Notice: Subject to any disclaimer, the term of this patent is extended or adjusted under 35 U.S.C. 154(b) by 865 days.

(21) Appl. No.: 10/892,455

(22) Filed: Jul. 16, 2004

(65) Prior Publication Data
US 2005/0043865 A1 Feb. 24, 2005

(30) Foreign Application Priority Data
Jul. 18, 2003 (FR) .................................. 03 08786

(51) Int. Cl.
*G05D 1/08* (2006.01)
*A63B 53/00* (2006.01)
*G01P 13/00* (2006.01)
*G01W 1/00* (2006.01)

(52) U.S. Cl. ....................... 701/7; 73/170.02; 73/861.65
(58) Field of Classification Search ................. 324/161, 324/163; 340/978; 701/6, 7, 8; 73/170.02, 73/861.65
See application file for complete search history.

(56) References Cited

U.S. PATENT DOCUMENTS

| | | | | |
|---|---|---|---|---|
| 3,318,146 A * | 5/1967 | Hagen et. al. | ................. | 73/180 |
| 5,233,542 A * | 8/1993 | Hohner et al. | ............... | 702/199 |
| 5,797,105 A * | 8/1998 | Nakaya et al. | ................. | 701/7 |
| 6,101,963 A * | 8/2000 | Shen et al. | ................... | 114/140 |
| 6,205,376 B1 | 3/2001 | Gordon | | |
| 6,466,888 B1 * | 10/2002 | McCool et al. | ............. | 702/144 |
| 6,594,559 B2 * | 7/2003 | Alwin et al. | .................. | 701/14 |
| 2003/0050766 A1 | 3/2003 | Cronin et al. | | |

OTHER PUBLICATIONS http://web.archive.org/web/20020611181446/http://www.grc.nasa.gov/WWW/K-12/airplane/isentrop.html.*
http://web.archive.org/web/20030207205202/http://www.grc.nasa.gov/WWW/K-12/airplane/liftco.html.*
Preliminary Search Report dated Jan. 21, 2004.

* cited by examiner

*Primary Examiner*—Khoi Tran
*Assistant Examiner*—Nicholas Kiswanto
(74) *Attorney, Agent, or Firm*—Dickinson Wright PLLC (57) ABSTRACT

A process for monitoring the validity of a speed cue of an aircraft may include computing a coefficient of lift, which is representative of the lift of the aircraft, on the basis of values of static and total pressure. A first value of angle of incidence is computed on the basis of the computed coefficient of lift, and a second value of angle of incidence is determined. The difference between the first and second values of angle of incidence is computed, and the absolute value of the difference is compared with a predetermined threshold value. Based on the comparison, the speed cue is deemed valid if the absolute value of the difference is below the threshold value and deemed invalid otherwise.

14 Claims, 4 Drawing Sheets

PROCESS AND DEVICE FOR MONITORING THE VALIDITY OF A SPEED CUE OF AN AIRCRAFT AND SYSTEM FOR GENERATING A SPEED CUE COMPRISING SUCH A DEVICE

FIELD OF THE INVENTION

The present invention relates to a process and a device for monitoring the validity of a speed cue of an aircraft, as well as to a system for generating a speed cue comprising such a monitoring device.

BACKGROUND OF THE RELATED ART

It is known that the knowledge of the speed of an aircraft relative to the air is paramount for the piloting of this aircraft. So, the crew monitors this speed cue (or value) very closely so as to keep the aircraft in a flight domain defined by minimum and maximum speeds, for which this aircraft was designed. For a given flight point, below the minimum speed, the aircraft is at risk of stalling, and above the maximum speed, it is subject to strong structural loads, for which it was not designed. It is therefore important that the crew should have accurate and reliable knowledge of the speed cue.

Moreover, it is also known that aircraft, and in particular airplanes such as transport airplanes, for example, are equipped with various probes designed to measure a certain number of parameters. These parameters are thereafter transmitted to onboard instruments. Thus, certain probes, located in proximity to the engine of the aircraft, provide information cues making it possible to follow the behavior of said engine (gas ejection temperature, revs, etc.) or to deliver information cues relating to the environment in which the aircraft is maneuvering (static pressure, total dynamic pressure, temperature, etc.). Other probes which are installed on the fuselage deliver only pressure or temperature information cues representative of the environment in which the aircraft is maneuvering. These probes are redundant and sited at different places on the aircraft, so as to avoid common faults (fault with several probes having a single cause). They use, for example, anemometers.

There are in particular probes, for example so-called "pitot" probes, which are intended for measuring dynamic pressure and probes, for example so-called "pepperpot" probes, which are intended for measuring static pressure.

The pressure values measured by the various probes, are in particular used by appropriate computers to compute speed cues of the aircraft.

These speed cues, namely, in general, three different speed cues per aircraft, are thereafter used by a flight control computer of the aircraft to compute flight control orders for maneuvering the aircraft. This flight control computer verifies, before using said speed cues, the consistency of these cues. If it deems that a speed cue is erroneous or spurious (for example, when the difference between this cue and the others is greater than a certain threshold), it discards this speed cue for the entire duration of the flight and now monitors only the latter two. In the case where the difference between these latter two speed cues becomes greater than a certain predefined threshold, the flight control computer definitively discards, for the remainder of the flight, these two cues, since it does not know which one has become spurious. In this case, said flight control computer switches to a degraded mode and alerts the crew that the speed cue available is no longer reliable. The aircraft is now governed only by so-called "degraded" control laws which no longer consider the speed cue and which are therefore less accurate and powerful.

However, there are faults that may go totally unnoticed at the flight control computer level, but these faults may have repercussions on the piloting of the aircraft, which may turn out to be very penalizing.

Thus, during maintenance operations, it is frequently the case that the "pitot" probes are made secure by protecting them with a hood, or even that the "pepperpot" probes are disconnected. It may happen that, through an omission of the maintenance personnel, the aircraft takes off although the probes have not been reconnected or their hoods have not be removed. They are therefore no longer operational and values which are delivered and provided to the computers are no longer representative of the environment in which the aircraft is maneuvering.

It is also conceivable that, although not being operational, two "pepperpot" probes may deliver mutually consistent speed values or cues which are completely erroneous, however. The mutual consistency of the speed cues then induces the flight control computer to discard the value delivered by the sole operational probe (the third "pepperpot" probe which in this situation produces the sole value representative of the environment in which the aircraft is maneuvering) in favor of the values delivered by these two "pepperpot" probes (delivering erroneous values). In this case, the flight control computer computes control orders with erroneous values and the crew trusts a speed cue that is not reliable.

Such a situation is very dangerous. Specifically, if the speed cue provides a speed which is too slow (respectively too fast), the crew will be led to accelerate (respectively to decelerate), thereby running the risk of making the aircraft fly in a domain of unauthorized speeds. It may also happen that the speed is such that the control laws do not cover this case, and this may lead to the loss of control of the aircraft.

Moreover, a fault with a static or total pressure measurement probe may also be produced by aerological phenomena which are sometimes encountered in flight (icing of the probes of the fuselage) or by the obscuring of said probes by dust, insects or other foreign bodies.

SUMMARY OF THE INVENTION

An object of the present invention is to remedy these drawbacks. It relates to a process for monitoring the validity of at least one speed cue of an aircraft, which is determined on the basis of at least one value of static pressure and of at least one value of total pressure, which process makes it possible to detect in a simple, fast and reliable manner any invalid speed cue, that is to say one that does not correspond (to within a margin) to the actual speed of the aircraft.

To this end, according to the invention, said process is noteworthy in that the following successive steps are carried out repetitively:
  a) said values of static and total pressure, used to determine said speed cue, are considered;
  b) a coefficient of lift which is representative of the lift of the aircraft is computed on the basis of said values of static and total pressure;
  c) a first value of angle of incidence is computed on the basis of this coefficient of lift;
  d) a second value of angle of incidence is determined;
  e) the difference between said first and second values of angle of incidence is computed;
  f) the absolute value of this difference is compared with a predetermined threshold value; and
  g) from said comparison one deduces that:

said speed cue is valid, if the absolute value of said difference is below said threshold value; and said speed cue is not valid, otherwise.

Thus, by virtue of the invention, it is possible to detect in a simple, fast and reliable manner any defect of validity of a speed cue. This makes it possible to remedy the aforesaid drawbacks. In particular, there is no longer any risk of discarding a speed cue which is valid and/or of considering one which is not valid.

In a particular embodiment, at least two values of static pressure are used, and in step a), the average of these values of static pressure is considered.

Advantageously, in step b), said coefficient of lift Cz is computed with the aid of the following expressions:

$$\begin{cases} Cz = \dfrac{nz.m.g}{0.7.PS.M^2.S} \\ M = \sqrt{5\left[\left(\dfrac{PT}{PS}\right)^{2/7} - 1\right]} \end{cases}$$

in which:

PS represents said static pressure value;

PT represents said total pressure value;

M represents the Mach number of the aircraft;

S represents a reference area which depends on the geometry of the aircraft;

nz represents the longitudinal load factor of the aircraft;

m represents the mass of the aircraft; and g represents the acceleration due to gravity.

Furthermore, advantageously, in step c), said first value of angle of incidence is computed on the basis of said coefficient of lift, as well as on the basis of the configuration of the aircraft and of the centering of said aircraft, and moreover on the basis of the Mach number of the aircraft, when the latter is in a smooth configuration.

In a preferred embodiment, in step d), said second value of angle of incidence is determined with the aid of a measurement carried out by at least one angle of incidence probe. It is known that such an angle of incidence probe exhibits very high reliability. Consequently, the detection of an invalid speed cue is implemented by comparison between a fallible angle of incidence (first value of angle of incidence dependent on said static and total pressures liable to be erroneous) and a quasi-infallible angle of incidence (second value of angle of incidence provided by said angle of incidence probe).

Of course, the process in accordance with the invention can be used to simultaneously monitor the validity of a plurality of different speed cues. In this case, according to the invention, said steps a) to g) are implemented for each of said speed cues.

The present invention also relates to a device for monitoring the validity of at least one speed cue of an aircraft, which is determined on the basis of at least one value of static pressure and of at least one value of total pressure. This device is capable of implementing the aforesaid process.

For this purpose, said device is noteworthy, according to the invention, in that it comprises:

a first means for considering said values of static and total pressure, used to determine said speed cue;

a second means for computing, on the basis of said values of static and total pressure, a coefficient of lift which is representative of the lift of the aircraft;

a third means for computing, on the basis of this coefficient of lift, a first value of angle of incidence;

a fourth means for determining a second value of angle of incidence;

a fifth means for computing the difference between said first and second values of angle of incidence;

a sixth means for comparing the absolute value of this difference with a predetermined threshold value; and a seventh means for deducing from said comparison that:

said speed cue is valid, if the absolute value of said difference is below said threshold value; and said speed cue is not valid, otherwise.

The present invention relates moreover to a system for generating at least one speed cue of an aircraft. According to the invention, said system of the type comprising:

at least one first probe for measuring a value of static pressure;

at least one second probe for measuring a value of total pressure; and at least one computer for computing said speed cue on the basis of said values of static and total pressure measured by said first and second probes, is noteworthy in that it moreover comprises:

a monitoring device such as described above; and at least one angle of incidence probe for measuring the angle of incidence of the aircraft, the measurement carried out by this angle of incidence probe being considered by said fourth means (of said monitoring device) as second value of angle of incidence.

In a particular embodiment, the system in accordance with the invention moreover comprises a disabling means making it possible to disable the monitoring implemented by said monitoring device.

Furthermore, in a preferred embodiment, said system comprises:

a set of four first probes;

a pressure sensor for measuring a value of static pressure;

a set of three second probes; and three computers for computing three different speed cues, on the basis of the value measured respectively by:

two of said first probes and a first of said second probes;

the other two first probes and a second of said second probes; and said pressure sensor and the third of said second probes, and said monitoring device monitors the validity of each of said three speed cues.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
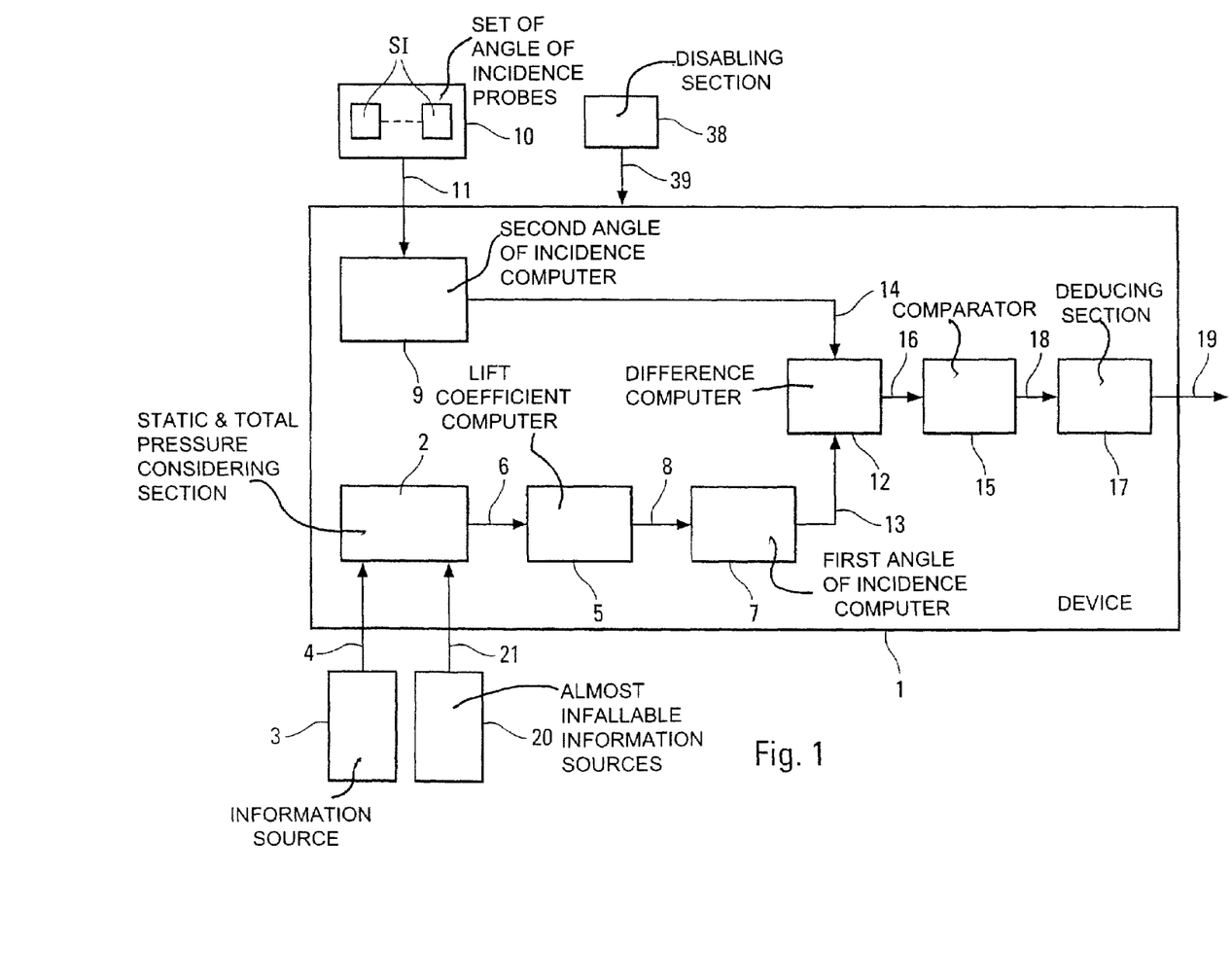
FIG. 1 is the schematic diagram of a monitoring device in accordance with the invention.
Figure 2:
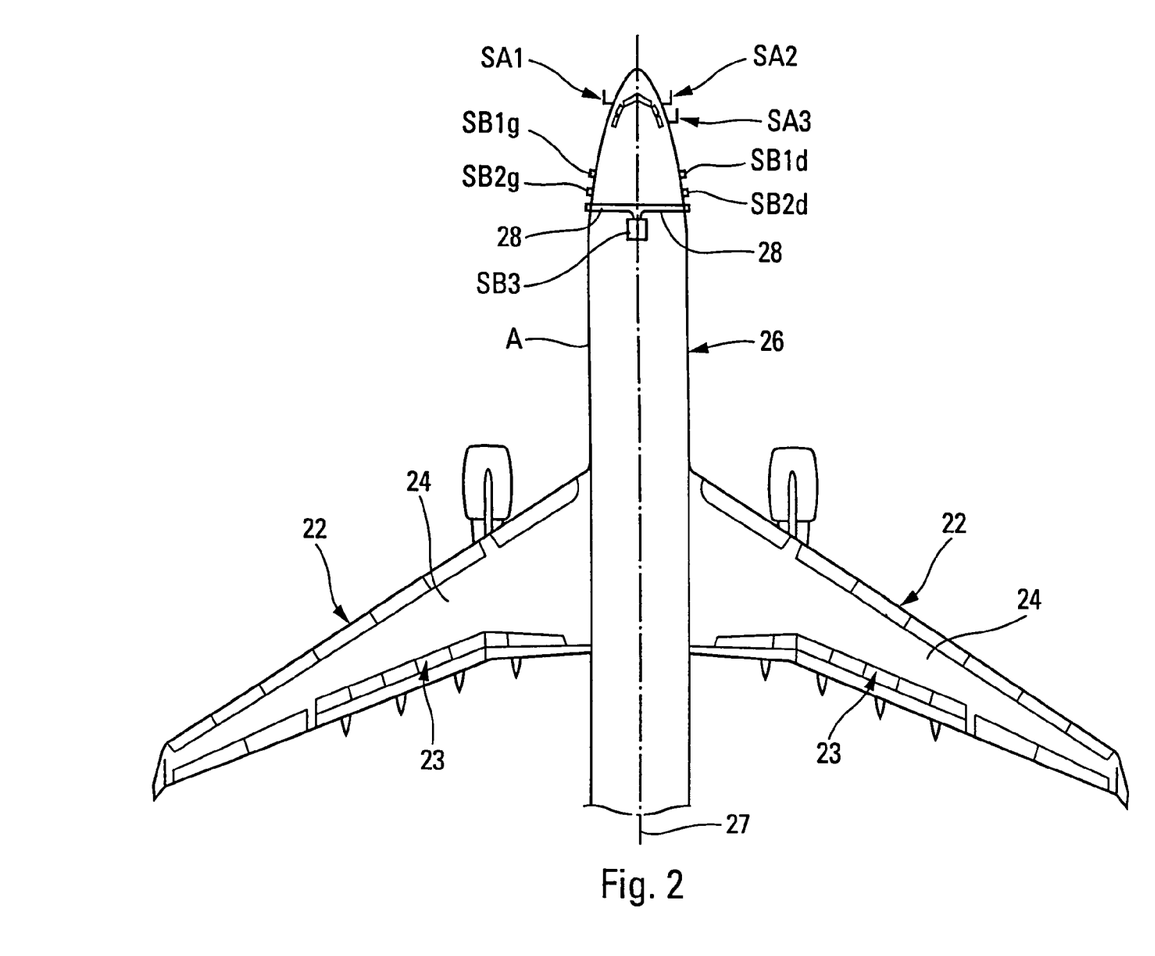
FIG. 2 partially illustrates an airplane, to which the present invention is applied.

The device 1 in accordance with the invention and represented diagrammatically in FIG. 1 is intended for monitoring the validity of at least one speed cue (that is to say of a speed value) of an aircraft A, in particular of a transport airplane, as represented in FIG. 2. Within the context of the present invention, said speed cue is determined on the basis of at least one value of static pressure PS and at least one value of total pressure PT, as specified hereinbelow.

According to the invention, said device 1 comprises:
- a means 2 for considering said values of static and total pressure, used to determine said speed cue. It receives these values PS and PT from a set 3 of information sources, specified hereinbelow, via a link 4;
- a means 5 which is connected by a link 6 to the means 2, for computing, on the basis of said values of static and total pressure PS and PT, a coefficient of lift Cz which is representative of the lift of the aircraft A;
- a means 7 which is connected by a link 8 to the means 5, for computing, on the basis of this coefficient of lift Cz, a first value of angle of incidence $\alpha A$;
- a means 9 for determining a second value of angle of incidence $\alpha B$, on the basis of measurements carried out by a set 10 of angle of incidence probes SI which are very reliable, said measurements being received via a link 11;
- a means 12 which is connected by links 13 and 14 respectively to said means 7 and 9, for computing the difference D between said first and second values of angle of incidence: $D = \alpha A - \alpha B$;
- a means 15 which is connected by a link 16 to the means 12, for comparing the absolute value |D| of this difference D with a predetermined threshold value SO; and
- a means 17 which is connected by a link 18 to the means 15, for deducing from said comparison that:
  said speed cue is valid, if the absolute value |D| of said difference D is below said threshold value SO; and
  said speed cue is not valid, if said absolute value |D| is greater than or equal to said threshold value SO,
  the result being transmitted via a link 19.

In a preferred embodiment, the means 5 computes said coefficient of lift Cz with the aid of the following expressions (1) and (2);

$$\begin{cases} Cz = \dfrac{nz.m.g}{0.7.PS.M^2.S} & (1) \\ M = \sqrt{5\left[\left(\dfrac{PT}{PS}\right)^{2/7} - 1\right]} & (2) \end{cases}$$

in which:
PS represents said static pressure value;
PT represents said total pressure value;
M represents the Mach number of the aircraft A;
S represents a reference area which depends on the geometry of the aircraft A;
nz represents the longitudinal load factor of the aircraft A;
m represents the mass of the aircraft A; and
g represents the acceleration due to gravity.

The pressure values PS and PT are provided by the set 3 specified hereinbelow and comprising information sources prone to faults. These values PS and PT which are used to compute the monitored speed cue, are therefore fallible.

On the other hand, the aforesaid parameters nz, m, g and S emanate from a set 20 of almost infallible information sources. This set 20 is connected by a link 21 to the device 1. More precisely, the factor nz is provided by inertial platforms of the aircraft A and the mass m is provided by a standard computer in charge of the centering of the aircraft A. The acceleration due to gravity g and the reference area S are constants, g being equal to 9.81 m/s². The value of S is known and computed as a function of the relevant aircraft A. Thus, each aircraft A possesses its own value of reference area S. The latter cues are therefore regarded as reliable.

Regarding the processing implemented by the means 7, a relation is considered between the coefficient Cz and the angle of incidence $\alpha A$, also depending on the configuration of the slats 22 and of the flaps 23 provided on the wings 24 of the airplane A (FIG. 2), on the centering of the airplane A and on its Mach number. The present invention is described below in its application to said airplane A of FIG. 2. The aforesaid relation is therefore determined by an aerodynamic modeling of the airplane A. In-flight trials are implemented thereafter to refine the results obtained through this modeling. Curves are thus obtained which express the coefficient Cz as a function of the angle of incidence $\alpha A$, of the centering of the airplane A and of the Mach number. For a given configuration of the airplane A, there therefore exists a net of curves C1 to C4 which are dependent on the centering of the airplane A, that is to say on the position of its center of gravity along the reference cord, on the angle of incidence of the airplane A and on the Mach number.

Figure 3:
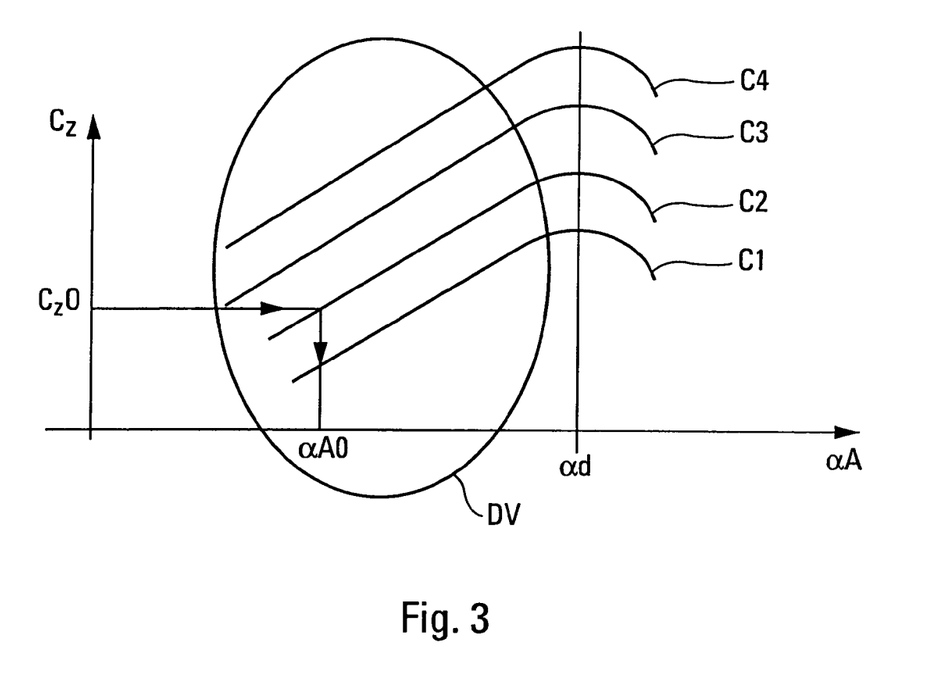
FIGS. 3 and 4 are two graphs for highlighting a particular step of a process in accordance with the invention.

Represented in FIG. 3, for a particular configuration of the airplane A, that is to say for particular positions of the slats 22 and flaps 23, is the value of the coefficient of lift Cz as a function of the angle of incidence $\alpha A$, for a plurality of different centerings illustrated by curves C1 to C4 respectively. By way of illustration, these curves C1 to C4 may correspond, respectively, to centerings of 20%, 30%, 40% and 50%. Also represented is the normal flight domain DV of the airplane A and the stalling angle of incidence $\alpha d$. For example, for the configuration relevant to the graph of FIG. 3, with a coefficient Cz of value Cz0 and a centering of 30% (curve C2), we obtain a value of angle of incidence $\alpha A$ of value $\alpha A0$.

Thus, by knowing the configuration of the airplane A (provided by a standard computer which manages this configuration as a function of the position of the slats 22 and of the flaps 23), the centering of the airplane A (provided in a standard manner by the computer which already provides the mass m) and the coefficient Cz computed by the means 5, the means 7 is able to determine said first value of angle of incidence $\alpha A$.

Figure 4:
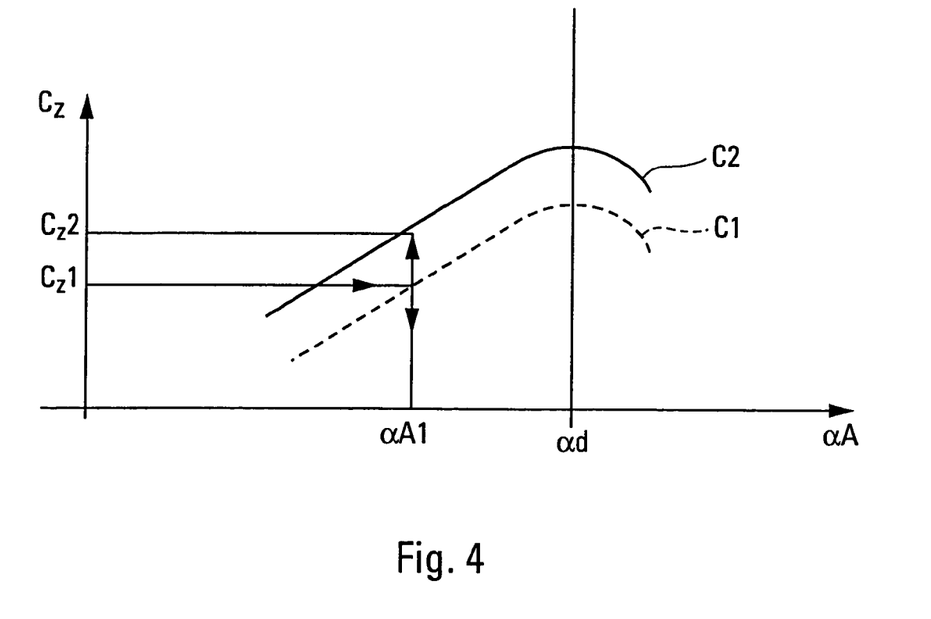

We can keep all the curves from C1 to C4 for each centering or note that in the normal flight domain DV (that is to say that where the airplane A flies for the greatest part), the curves are linear. In this case, it is possible to simplify the net of curves, by retaining just one curve (for example curve C2 at 30%) and by carrying out an extrapolation for any centering which is different (from 30%), as represented in FIG. 4. In this case, on the basis of a coefficient Cz of value Cz1 computed by the means 5, for a centering of 20% (curve C1 represented by dashes to facilitate understanding), we compute by linearity the value of Cz2 that we would have if the centering had been 30%, and knowing the relation between the coefficient Cz at 30% and the value $\alpha A$ (curve C2), from this we deduce the corresponding value of the angle of incidence $\alpha A$, in this instance $\alpha A1$.

Figure 5:
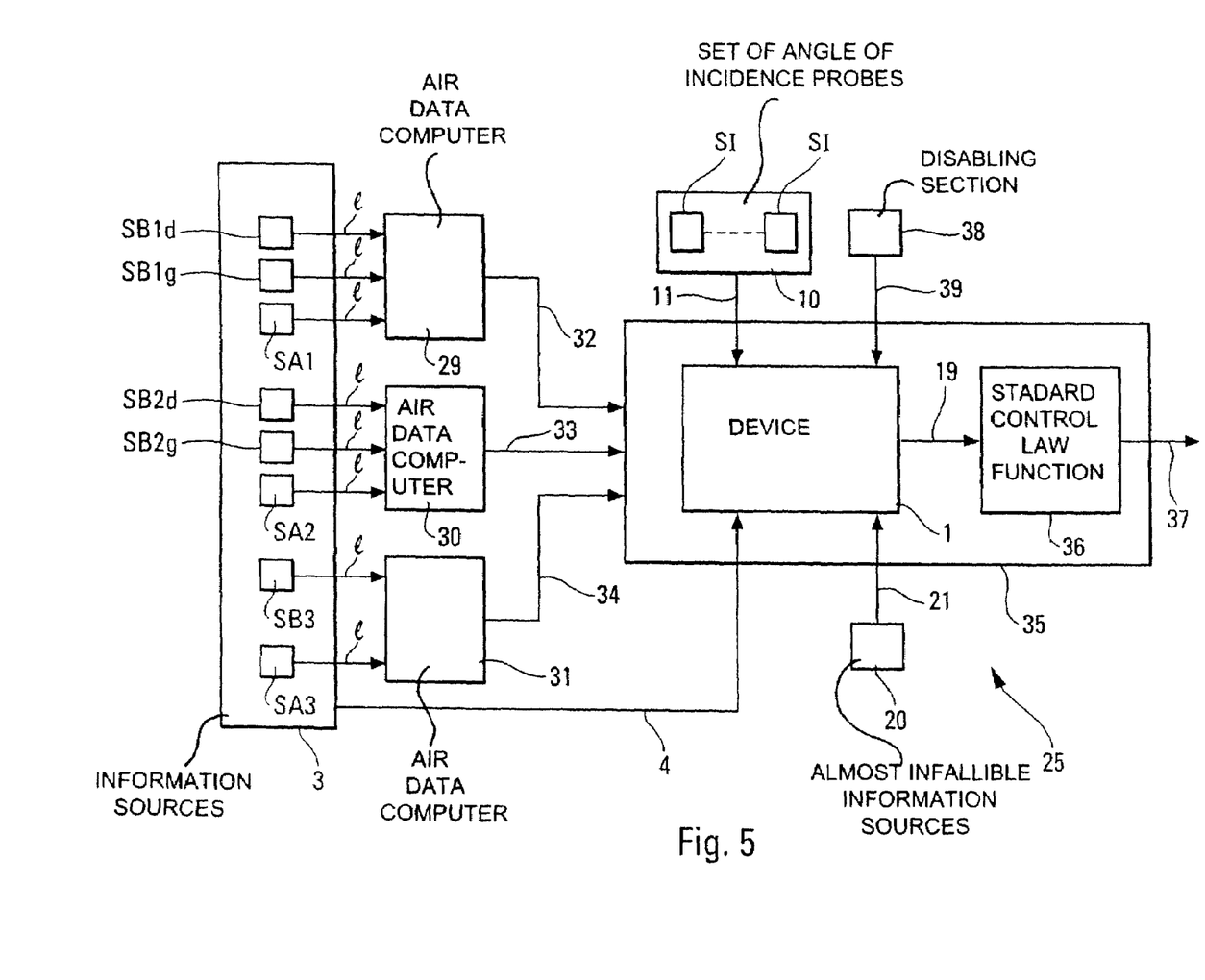
FIG. 5 is the schematic diagram of a speed cue generation system, in accordance with the invention.

Although not exclusively, the present invention applies more particularly to a system 25 for generating at least one speed cue, such as the system represented in FIG. 5, of an airplane A (FIG. 2).

Said system 25 comprises the set 3 of information sources for producing values of static pressure PS and of total pressure PT. In a preferred embodiment, said set 3 comprises:
three "pitot" probes SA1, SA2, SA3 which are installed on the fuselage 26 of the airplane A, as illustrated diagrammatically in FIG. 2, for measuring the total pressure, namely PT1, PT2 and PT3 respectively;

four "pepperpot" probes SB1$d$, SB1$g$, SB2$d$, SB2$g$ which are installed on the fuselage 26 of the airplane A on either side of its longitudinal axis 27, for measuring the static pressure, namely PS1$d$, PS1$g$, PS2$d$ and PS2$g$ respectively; and a pressure sensor SB3 which measures the static pressure PS3 and which is connected, on each side of the fuselage 26, to the open air, by way of a straightforward duct 28.

The system 25 moreover comprises computers 29, 30, 31, in particular of the ADC ("Air Data Computer") type, which each compute on the basis of the measurements carried out by said set 3, whose information sources are connected by links 1 to said computers 29, 30, 31, a speed V1, V2, V3 representing a speed cue to be monitored. More precisely, the computer 29 receives the values PT1, PS1$d$ and PS1$g$. It averages PS1$d$ and PS1$g$ to form PS1 averaged, then computes the speed V1 from PT1 and PS1 averaged;

the computer 30 receives the values PT2, PS2$d$ and PS2$g$. It averages PS2$d$ and PS2$g$ to form PS2 averaged, then computes the speed V2 from PT2 and PS2 averaged; and the computer 31 receives the values PT3 and PS3. It computes the speed V3 from these values PT3 and PS3.

Generally, the speeds V1 and V2 are displayed directly to the crew of the airplane A, V1 being displayed on one of the display screens of the flight deck and V2 on the other. Nevertheless, the crew retains the option, in case of doubt, of displaying the speed V3 originating from the computer 31 on one or the other of said display screens.

These speed cues V1, V2 and V3 are transmitted by way of links 32, 33 and 34 to a standard flight control computer 35, which uses them to compute with the aid of a function 36 implementing a standard control law, flight control orders which are, thereafter, transmitted via a link 37 to standard user devices (not represented).

In this application, the monitoring device 1 has the object of monitoring the validity of the various speed cues V1, V2 and V3 computed by said computers 29, 30 and 31.

For this purpose, said system 25 therefore also comprises;
said monitoring device 1;
said set 10 of angle of incidence probes SI; and
said set 20 of information sources.

For each of the speed cues V1 to V3, the monitoring device 1 implements the various aforesaid steps. It therefore determines in particular, for each of them, a coefficient Cz and an angle of incidence $\alpha$A which is compared with an angle of incidence $\alpha$B obtained from the set 10.

By way of illustration, said set 10 can comprise two angle of incidence probes SI, for example of "windvane" type, which are installed symmetrically on the wings 24 of the airplane A and the angle of incidence $\alpha$B corresponds to the average (computed for example by the means 9) of the measurements carried out by these two angle of incidence probes SI.

When it detects an invalid speed cue, the monitoring device 1, informs the various user devices thereof via the link 19, and in particular the flight control computer 35. In the preferred embodiment represented, said monitoring device 1 is integrated directly into said flight control computer 35.

As indicated above, in an airplane in which the present invention is not incorporated, after a declared invalidity of a first speed cue and then a problem with one of the other two remaining speed cues, the airplane switches to degraded mode, since the flight control computer does not know how to determine which information source is invalid. On the contrary, by virtue of the present invention, in the case where only two values are available, the flight control computer 35 is able to discard as appropriate the erroneous value and to keep the sound value so that, in this situation, the airplane A does not switch to degraded mode and the control laws continue to be computed in standard fashion.

In the case of a maintenance error inducing the airplane A to take off although the static or dynamic pressure probes are not operational, the present invention makes it possible to detect the erroneous speed cues. In particular, in the case of consistency between two information sources, but which nevertheless are not representative of the environment in which the airplane is maneuvering, the invention makes it possible to detect this problem. It is, in this case, easy to indicate to the crew in an infallible manner whether the speed cue or cues displayed actually represent the environment in which the airplane A is maneuvering.

Additionally, said system 25 comprises, furthermore, a manual or automatic disabling means 38 which is connected by a link 39 to the monitoring device 1 and which makes it possible to disable the monitoring implemented by the monitoring device 1.

It is in particular possible to disable or deactivate said monitoring device 1:

when the airplane A is on the ground;

when the slats 22 and the flaps 23 are in the transient phase (retraction or deployment), the curves Cz=f ($\alpha$A, airplane centering, configuration of the slats and flaps, Mach number) being valid solely in the steady state; and when the airbrakes of the airplane A are extended.

The invention claimed is:

1. A process for monitoring the validity of at least one speed cue of an aircraft, which is determined on the basis of at least one value of static pressure and of at least one value of total pressure, wherein the following is carried out repetitively on a computer:

considering said values of static and total pressure, simultaneously used to determine said speed cue;

calculating a coefficient of lift Cz which is representative of the lift of the aircraft on the basis of said values of static and total pressure;

calculating a first value of angle of incidence from the values of static and total pressure via the calculated coefficient of lift;

determining a second value of angle of incidence;

computing the difference between said first and second values of angle of incidence;

comparing the absolute value of this difference with a predetermined threshold value; and from said comparison one deduces that:

said speed cue is valid, if the absolute value of said difference is below said threshold value; and said speed cue is not valid, otherwise, wherein:

calculating said coefficient of lift Cz with the aid of the following expressions:

$$\begin{cases} Cz = \dfrac{nz.m.g}{0.7.PS.M^2.S} \\ M = \sqrt{5\left[\left(\dfrac{PT}{PS}\right)^{2/7} - 1\right]} \end{cases}$$

in which:
PS represents said static pressure value;
PT represents said total pressure value;
M represents the Mach number of the aircraft;
S represents a reference area which depends on the geometry of the aircraft;
nz represents the longitudinal load factor of the aircraft;

m represents the mass of the aircraft; and g represents the acceleration due to gravity.

2. A device for monitoring the validity of at least one speed cue of an aircraft, which is determined on the basis of at least one value of static pressure and of at least one value of total pressure, which device comprises:
- a considering section that considers said values of static and total pressure, simultaneously used to determine said speed cue;
- a first computer that calculates, on the basis of said values of static and total pressure, a coefficient of lift Cz which is representative of the lift of the aircraft;
- a second computer that calculates a first value of angle of incidence from the values of static and total pressure via the calculated coefficient of lift Cz;
- a determining section that determines a second value of angle of incidence;
- a third computer that computes the difference between said first and second values of angle of incidence;
- a comparator that compares the absolute value of this difference with a predetermined threshold value; and
- a deducing section that deduces from said comparison that:
  said speed cue is valid, if the absolute value of said difference is below said threshold value; and
  said speed cue is not valid, otherwise, wherein:
the first computer calculates said coefficient of lift Cz with the aid of the following expressions:

$$\begin{cases} Cz = \dfrac{nz.m.g}{0.7.PS.M^2.S} \\ M = \sqrt{5\left[\left(\dfrac{PT}{PS}\right)^{2/7} - 1\right]} \end{cases}$$

in which:

PS represents said static pressure value;

PT represents said total pressure value;

M represents the Mach number of the aircraft;

S represents a reference area which depends on the geometry of the aircraft;

nz represents the longitudinal load factor of the aircraft;

m represents the mass of the aircraft; and g represents the acceleration due to gravity.

3. A process for monitoring the validity of at least one speed cue of an aircraft, which is determined on the basis of at least one value of static pressure and of at least one value of total pressure, wherein the following is carried out repetitively:
- considering said values of static and total pressure, simultaneously used to determine said speed cue;
- calculating a coefficient of lift Cz which is representative of the lift of the aircraft on the basis of said values of static and total pressure;
- calculating a first value of angle of incidence from the values of static and total pressure via the calculated coefficient of lift, and considering a relation between the coefficient Cz and the angle of incidence, centering of the aircraft and on the aircraft's Mach number;
- determining a second value of angle of incidence;
- computing the difference between said first and second values of angle of incidence;
- comparing the absolute value of this difference with a predetermined threshold value; and
- from said comparison one deduces that:
  said speed cue is valid, if the absolute value of said difference is below said threshold value; and
  said speed cue is not valid, otherwise, wherein:
calculating said coefficient of lift Cz with the aid of the following expressions:

$$\begin{cases} Cz = \dfrac{nz.m.g}{0.7.PS.M^2.S} \\ M = \sqrt{5\left[\left(\dfrac{PT}{PS}\right)^{2/7} - 1\right]} \end{cases}$$

in which:

PS represents said static pressure value;

PT represents said total pressure value;

M represents the Mach number of the aircraft;

S represents a reference area which depends on the geometry of the aircraft;

nz represents the longitudinal load factor of the aircraft;

m represents the mass of the aircraft; and g represents the acceleration due to gravity;

obtaining curves which express the coefficient Cz as a function of the angle of incidence of the centering of the aircraft and the Mach number; and determining a corresponding set of curves for a specified configuration of the aircraft which are dependent on the centering of the angle of incidence and the Mach number.

4. The process as claimed in claim 1, wherein at least two values of static pressure are used, and wherein the average of these values of static pressure is considered.

5. The process as claimed in claim 1, wherein:
- a plurality of curves express the aircraft's coefficient of lift Cz as a function of the aircraft's angle of incidence such that each curve represents a different aircraft centering, which is the aircraft's center of gravity along a reference chord, and
- said first value of angle of incidence is calculated from the plurality of curves on the basis of said coefficient of lift Cz, the positions of the aircraft's slats and flaps, and the centering of said aircraft.

6. The process as claimed in claim 5, wherein said first value of angle of incidence is calculated moreover on the basis of the Mach number of the aircraft when the latter is in a smooth configuration.

7. The process as claimed in claim 1, wherein said second value of angle of incidence is determined with the aid of a measurement carried out by at least one angle of incidence probe.

8. The process as claimed in claim 1, for simultaneously monitoring the validity of a plurality of speed cues, wherein the process is implemented for each of said speed cues.

9. A system for generating at least one speed cue of an aircraft, said system comprising the monitoring device of claim 2 and further comprising:
- at least one first probe for measuring a value of static pressure;
- at least one second probe for measuring a value of total pressure;
- at least one fourth computer for computing said speed cue on the basis of said values of static and total pressure measured by said first and second probes; and
- at least one angle of incidence probe for measuring the angle of incidence of the aircraft, the measurement carried out by this angle of incidence probe being considered by said determining section of said monitoring device as second value of angle of incidence.

10. The system as claimed in claim 9, which moreover comprises a disabling section making it possible to disable the monitoring implemented by said monitoring device.

11. The system as claimed in claim 9, wherein said monitoring device forms part of a flight control computer which uses said speed cue, at least to compute flight control orders of the aircraft.

12. The system as claimed in claim 9, which comprises:
- a set of four first probes;
- a pressure sensor for measuring a value of static pressure;
- a set of three second probes; and
- three fifth computers for computing three different speed cues, on the basis of the value measured, respectively, by:
  - two of said first probes and a first of said second probes;
  - the other two first probes and a second of said second probes; and
  - said pressure sensor and the third of said second probes, and wherein said monitoring device monitors the validity of each of said three speed cues.

13. The process of claim 1, wherein the angle of incidence is calculated by extrapolating a known angle of incidence for a known aircraft centering, which is the aircraft's center of gravity along a reference chord, based on the aircraft's actual centering.

14. The process of claim 1, wherein the process is performed by a flight control computer that relies on the speed cue for controlling the flight of the aircraft if the speed cue is determined to be valid and otherwise relies on another speed cue.

* * * * *